United States Patent
Gutowski et al.

(12)

(10) Patent No.: US 11,913,494 B2
(45) Date of Patent: Feb. 27, 2024

(54) HUB BEARING ASSEMBLY

(71) Applicants: AKTIEBOLAGET SKF, Gothenburg (SE); PEER Bearing Company, Waukegan, IL (US)

(72) Inventors: Jordan Eric Gutowski, Vernon Hills, IL (US); Andrew Michael Bauer, Salem, WI (US); Stefano Urso, Bologna (IT); Marco Erminio Panchetti, Turin (IT); Massimo Marivo, Airasca (IT); Giacomo Alvisi, Bologna (IT); Pierangelo Cherio, Turin (IT); Roberto Viglietti, Bologna (IT); Riccardo Venturucci, Turin (IT)

(73) Assignees: PEER BEARING COMPANY, Waukegan, IL (US); AKTIEBOLAGET SKF, Gothenburg (SE)

( * ) Notice: Subject to any disclaimer, the term of this patent is extended or adjusted under 35 U.S.C. 154(b) by 23 days.

(21) Appl. No.: 17/739,477

(22) Filed: May 9, 2022

(65) Prior Publication Data

US 2022/0364593 A1  Nov. 17, 2022

(30) Foreign Application Priority Data

May 14, 2021 (IT) .................. 102021000012431

(51) Int. Cl.
  *F16C 19/18* (2006.01)
  *F16C 33/80* (2006.01)
  (Continued)

(52) U.S. Cl.
  CPC ........ *F16C 19/183* (2013.01); *F16C 33/7823* (2013.01); *F16C 33/7886* (2013.01);
  (Continued)

(58) Field of Classification Search
  CPC ............... F16C 19/183; F16C 33/7823; F16C 33/7843; F16C 33/7856; F16C 33/7886;
  (Continued)

(56) References Cited

U.S. PATENT DOCUMENTS

| 4,448,461 A | 5/1984 | Otto |
| 5,346,662 A * | 9/1994 | Black et al. ......... F16J 15/3256 |
| | | 264/277 |

(Continued)

FOREIGN PATENT DOCUMENTS

| DE | 102016211196 A1 | 12/2017 |
| EP | 2661947 A2 | 11/2013 |
| EP | 2664810 A2 | 11/2013 |

OTHER PUBLICATIONS

EP2661947_DESCRIPTION.*

(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A hub bearing assembly includes a housing with a vertical bore, a bearing outer ring disposed within the bore and coupled with the housing and a bearing inner ring disposed within the bearing outer ring and having a central bore configured to receive a portion of the shaft. A set of rolling elements are disposed between the bearing outer and inner rings. An upper seal is disposed within the housing bore externally of the outer ring and includes an annular elastomeric seal body and a garter spring biasing a seal lip radially inwardly. A lower seal is disposed between the bearing outer and inner rings. Either the bearing inner ring is sized such that upper seal is disposed about the bearing inner ring or the hub bearing assembly further comprises an annular spacer (Continued)

disposed within the upper seal and adjacent to the upper axial end of the bearing inner ring.

19 Claims, 13 Drawing Sheets

(51) Int. Cl.
    *F16C 33/78*     (2006.01)
    *F16C 35/04*     (2006.01)
    *F16J 15/3256*     (2016.01)

(52) U.S. Cl.
    CPC .......... *F16C 33/7889* (2013.01); *F16C 33/80* (2013.01); *F16C 35/045* (2013.01); *F16J 15/3256* (2013.01); *F16C 2310/00* (2013.01); *F16C 2326/02* (2013.01)

(58) Field of Classification Search
    CPC ...... F16C 33/80; F16C 33/805; F16C 35/045; F16C 2300/34; F16C 2310/00; F16C 2326/02; F16J 15/3256
    See application file for complete search history.

(56) References Cited

U.S. PATENT DOCUMENTS

| | | | |
|---|---|---|---|
| 2010/0025057 A1* | 2/2010 | Andersson | F16C 19/184 384/544 |
| 2015/0156954 A1* | 6/2015 | Ciulla | F16C 19/184 384/460 |
| 2017/0370415 A1 | 12/2017 | Edelmann et al. | |
| 2019/0093707 A1* | 3/2019 | Adams | F16C 33/723 |
| 2021/0348646 A1* | 11/2021 | Marivo | F16C 33/768 |

OTHER PUBLICATIONS

Written Opinion and Search Report from the Italian Patent Office dated Feb. 11, 2022 in related Italian application No. 102021000012431, and translation thereof.

\* cited by examiner

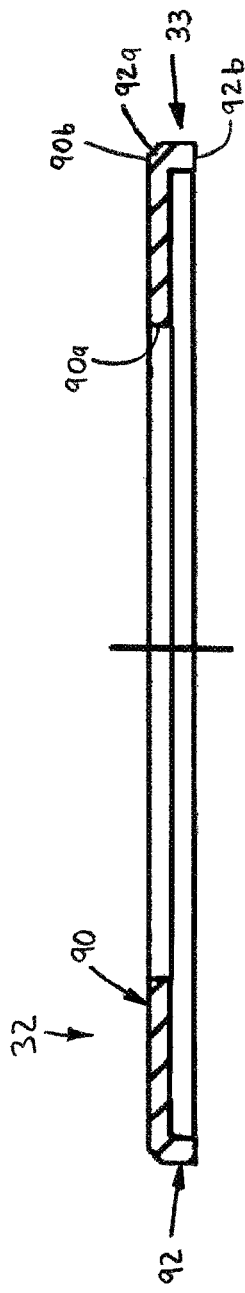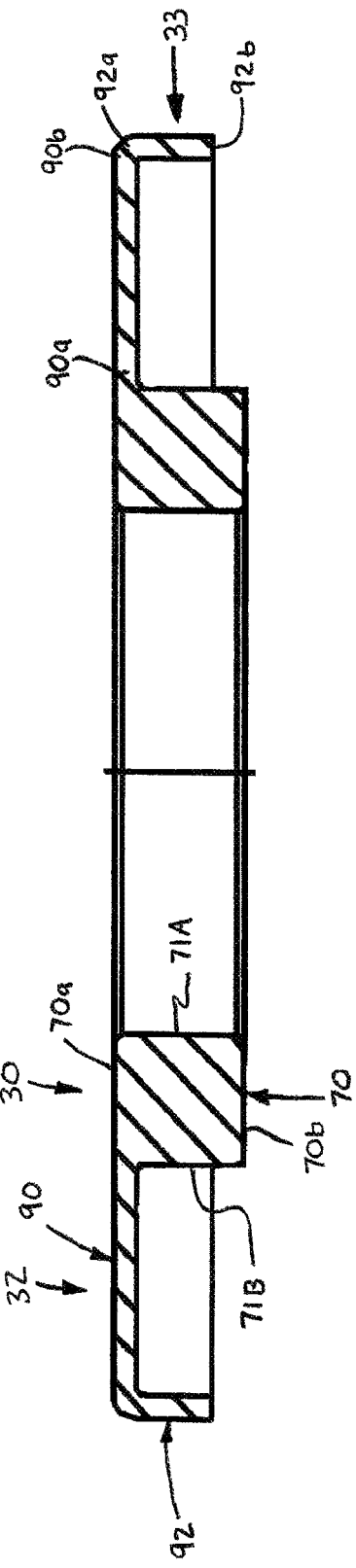

HUB BEARING ASSEMBLY

CROSS-REFERENCE

This application claims priority to Italian Patent Application No. 102021000012431 filed on May 14, 2021, the entire contents of which are incorporated by reference herein.

BACKGROUND OF THE INVENTION

The present invention relates to bearings, and more particularly to hub bearing assemblies.

Hub bearing assemblies for machines such as mowers or other agricultural equipment are generally known and typically include a housing, inner and outer bearing rings and one or more sets of rolling elements which form a bearing. Seals are generally provided to prevent debris and contaminants from entering into the bearing. In the particular application of a mower, such a hub bearing assembly typically supports a vertically-extending shaft which operates a tool, for example a mower blade assembly, and a gear is preferably mounted on and drives the shaft, and thereby the tool, to angularly displace about a vertical axis.

SUMMARY OF THE INVENTION

In one aspect, the present invention is a hub bearing assembly for supporting a shaft angularly displaceable about a vertical axis and connected with a tool. The hub bearing assembly comprises a housing having upper and lower ends, a central bore extending vertically between the upper and lower ends, the vertical axis extending longitudinally through the bore. A bearing outer ring is disposed within the housing bore and is coupled with the housing. A bearing inner ring is disposed within the bearing outer ring and has a central bore configured to receive a portion of the shaft. At least one set of a plurality of rolling elements is disposed between the bearing outer ring and the bearing inner ring and is spaced circumferentially about the vertical axis. An upper seal is disposed within the housing bore externally of the bearing outer ring so as to be spaced axially above the rolling elements and adjacent to the housing upper end. The upper seal includes an annular elastomeric seal body with a sealing lip and a garter spring disposed about the lip for biasing the lip radially inwardly toward the vertical axis. Further, a lower seal is disposed between the bearing inner ring and the bearing outer ring so as to be spaced axially below the rolling elements.

In certain constructions, the bearing inner ring is sized such that the upper axial end of the bearing inner ring is radially aligned with the housing upper end and the upper seal is disposed about the bearing inner ring. In other constructions, the hub bearing assembly further comprises an annular spacer disposed within the upper seal and adjacent to the upper axial end of the bearing inner ring. Preferably, the hub bearing assembly further comprises an annular shield plate coupled with the spacer or with the upper axial end of the bearing inner ring and extending radially outwardly so as to extend over the upper end of the housing to form a labyrinth seal.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 13 is an axial cross-sectional view of a shield of the first construction hub bearing assembly; and FIG. 14 is an axial cross-sectional view of an integral shield and spacer of the second construction hub bearing assembly.

DETAILED DESCRIPTION OF THE INVENTION

Certain terminology is used in the following description for convenience only and is not limiting. The words "above", "below", "downwardly", "lower" and "upper" designate directions along a central vertical axis of a hub bearing assembly. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
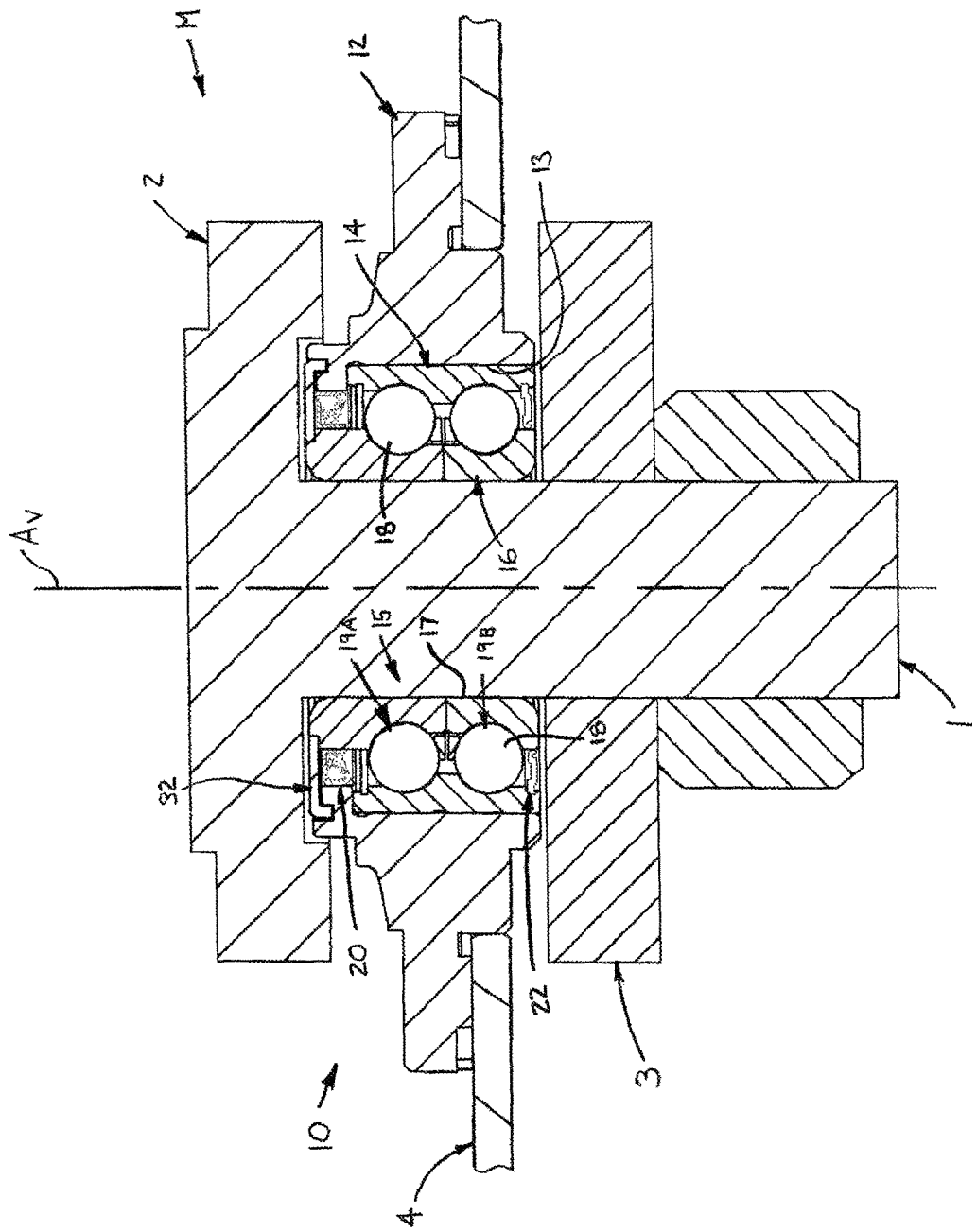
FIG. 1 is an axial cross-sectional view of a portion of a machine assembly including a hub bearing assembly in accordance with a first construction.
Figure 2:
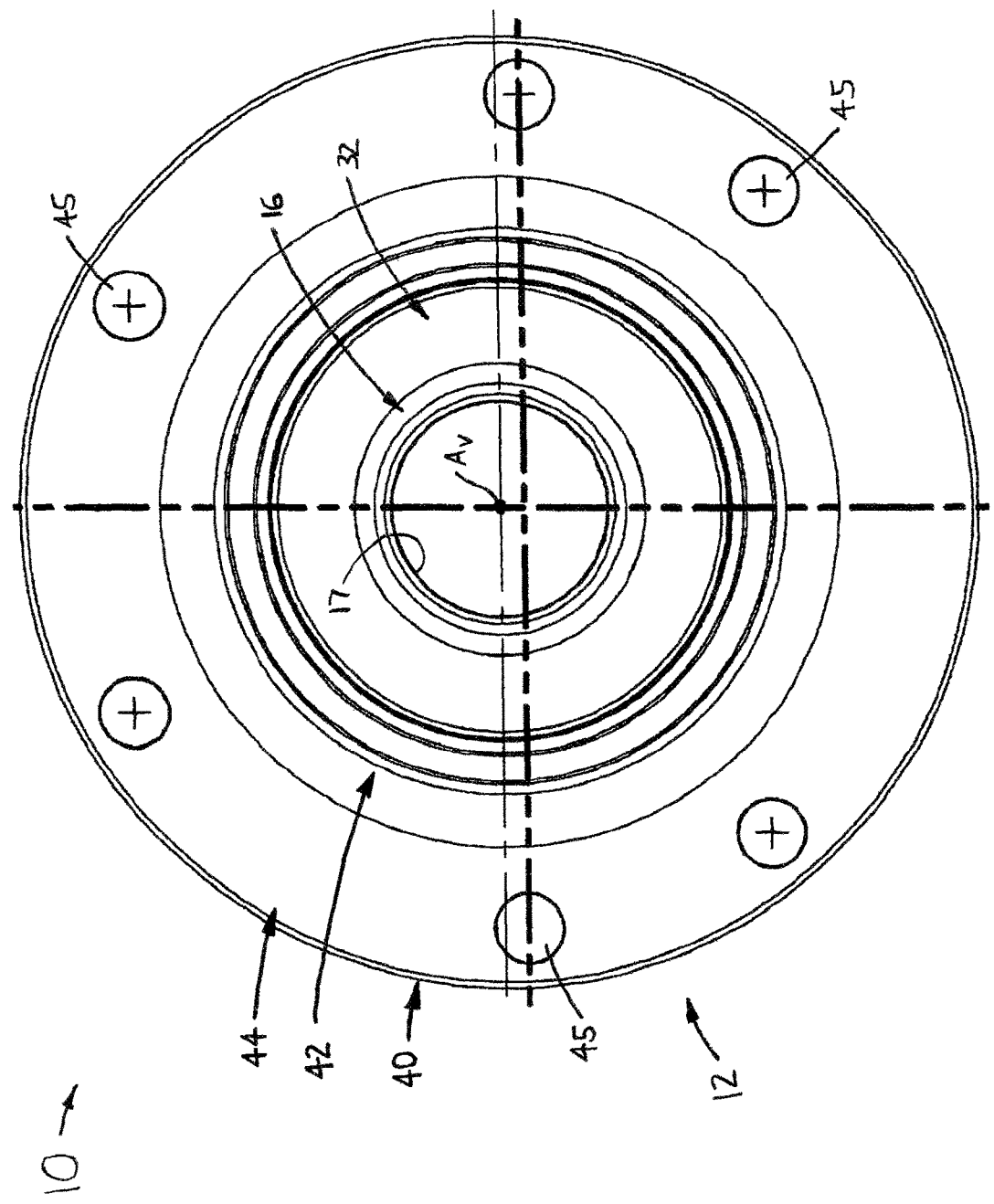
FIG. 2 is a top plan view of the first construction hub bearing assembly.

Referring now to the drawings in detail, wherein like numbers are used to indicate like elements throughout, there is shown in FIGS. 1-14 a hub bearing assembly 10 for supporting a shaft 1 angularly displaceable about a vertical axis $A_V$ and connected with a tool 2, which may be a mower blade assembly or other appropriate component. As shown in FIG. 1, a gear or pulley 3 may be mounted on the shaft 1 and driven to rotate or pivot the shaft 1 about the axis $A_V$, such that angular displacement of the shaft 1 rotates/pivots the tool 2 relative to a frame 4 of a machine M. Basically, the hub bearing assembly 10 comprises a housing 12 with a central bore 13, a bearing outer ring 14 disposed within the bore 13, a bearing inner ring 16 disposed within the bearing outer ring 14 so as to form a bearing 15, at least one and preferably two sets 19A, 19B of rolling elements 18 disposed between the outer and inner rings 14, 16 within a bearing interior space SB, an upper seal 20 and a lower seal 22. More specifically, the housing 12 has an upper end 12a and a lower end 12b, the central bore 13 extending vertically between the upper and lower ends 12a, 12b and the vertical axis $A_V$ extending longitudinally through the bore 13. The bearing outer ring 14 is coupled with the housing 12 and the bearing inner ring 16 has a central bore 17 configured to receive a portion of the shaft 1. The rolling elements 18 are spaced circumferentially about the vertical axis $A_V$ and are preferably balls, but may be cylindrical rollers, tapered rollers, spherical rollers, needles, etc. and the hub assembly 10 may include only a single set of rollers or three or more sets of rollers (not shown).

Further, the upper seal 20 is disposed within the housing bore 13 externally of the bearing outer ring 14 so as to be spaced axially above the rolling elements 18 and adjacent to the housing upper end 12a and functions to both prevent debris (e.g., plant cuttings) or contaminants from passing downwardly into the bearing inner space SB and also to retain lubricant (e.g., grease) within the space SB. The upper seal 20 is preferably formed as a cartridge seal 80, as described below, and includes an annular elastomeric seal body 24 with one or more sealing lips 24a. The upper seal 24 may include a garter spring 26 disposed about a primary lip 24a and configured to bias the lip 24a radially inwardly toward the vertical axis $A_V$. However, the seal body 24 may instead be formed to function without a garter spring or other biasing member, such as for example, including one or more conical lips 24a, etc.

Furthermore, the lower seal 22 is disposed within the bearing interior space SB between the bearing outer ring 14 and the bearing inner ring 16 so as to be spaced axially below the rolling elements 18 and is preferably generally flat so as to minimize space requirements within the bearing 15. The lower seal 22 functions to retain lubricant within the bearing interior space SB and also prevents contaminants from entering into the bearing 15.

Figure 3:
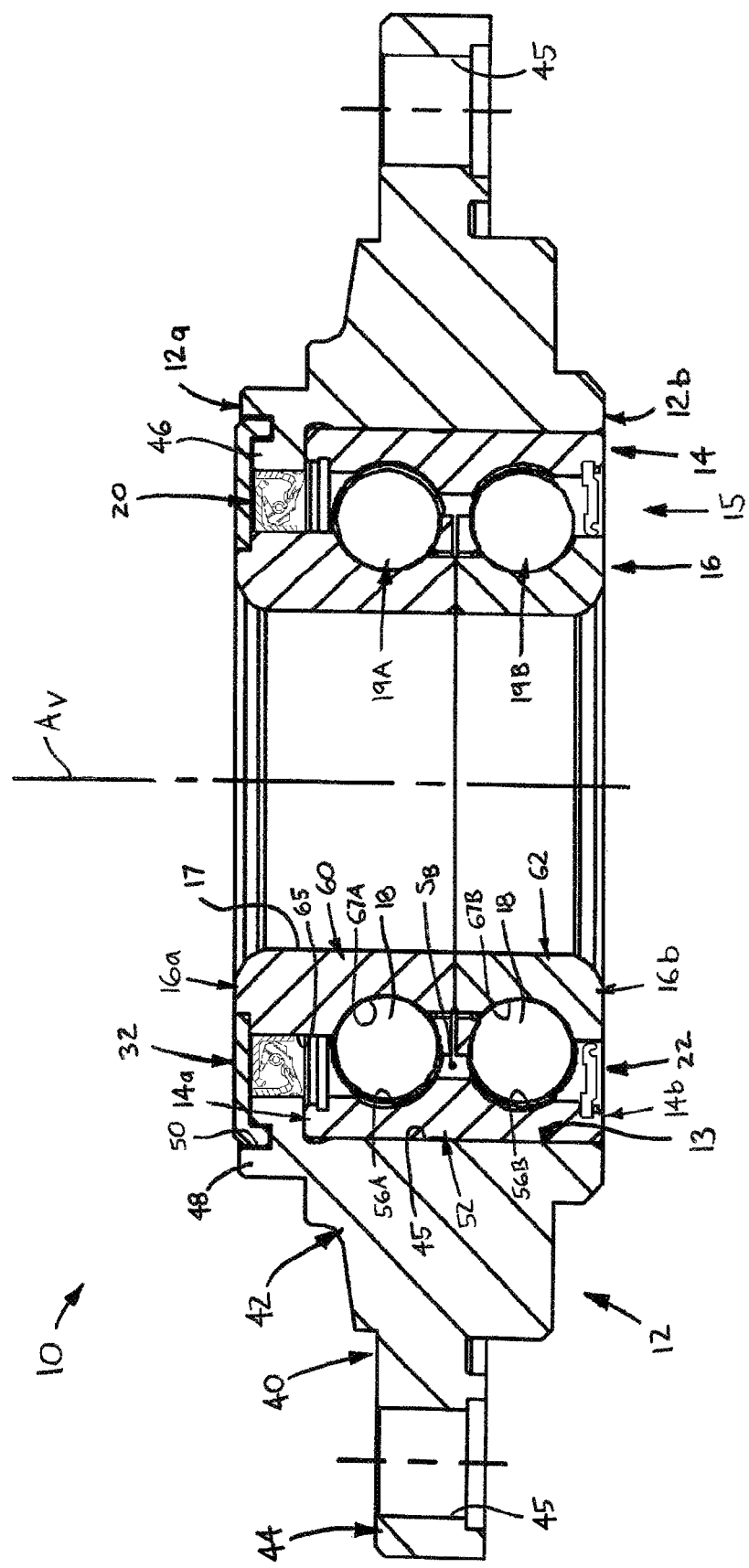
FIG. 3 is an enlarged axial cross-sectional view of the first construction hub bearing assembly.
Figure 4:
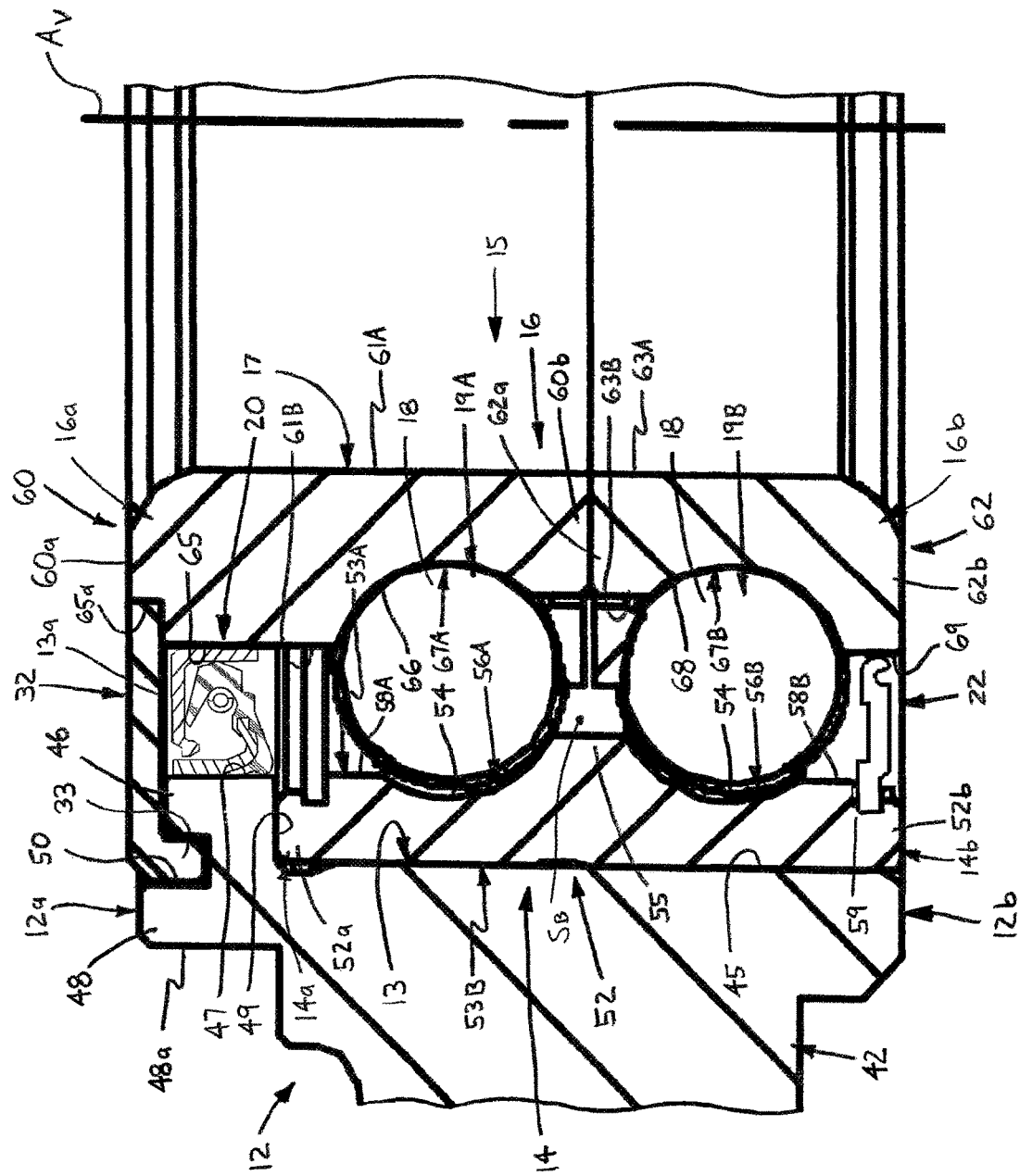
FIG. 4 is a more enlarged view of a portion of FIG. 3.
Figure 5:
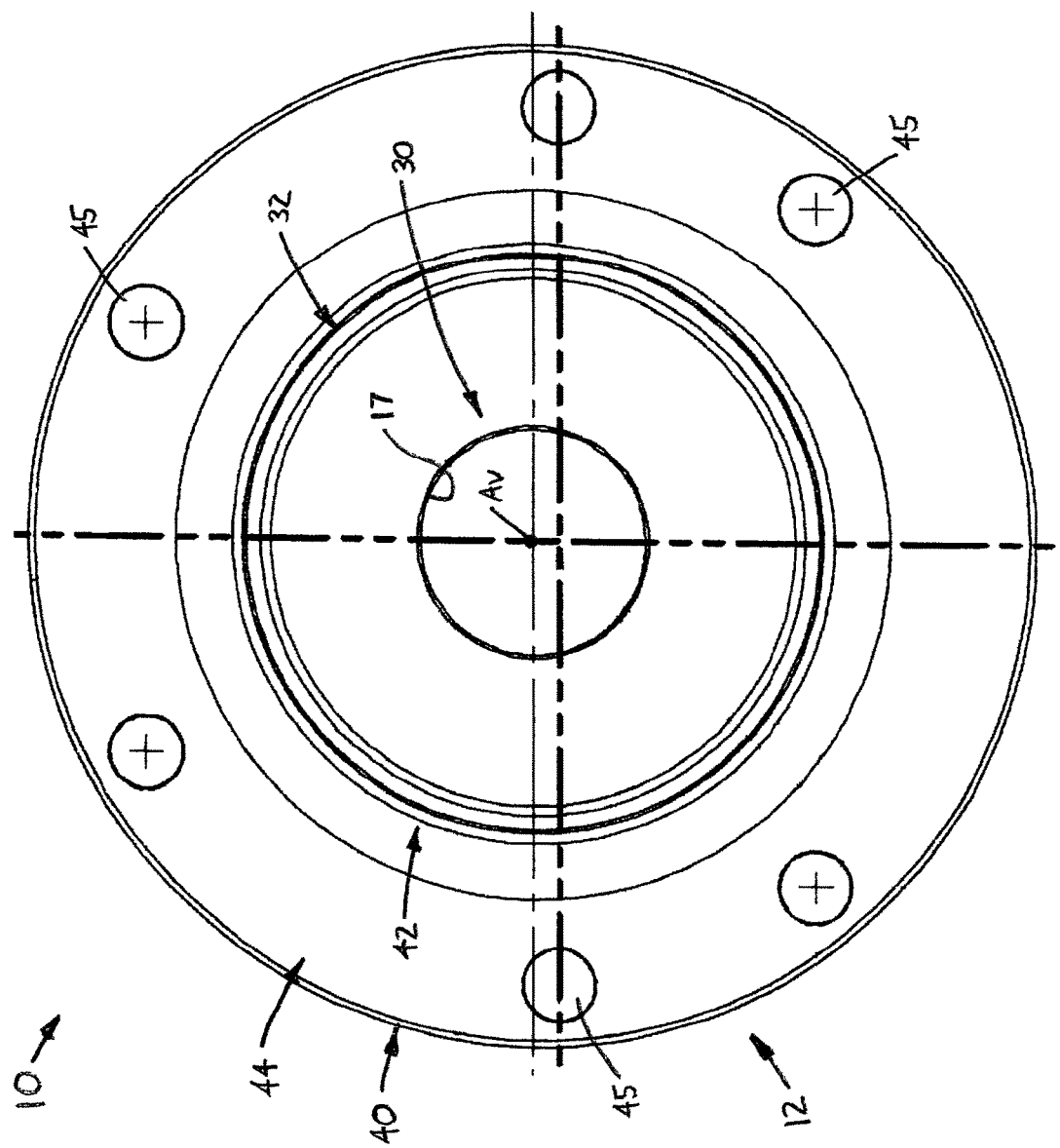
FIG. 5 is a top plan view of a second construction hub bearing assembly.

In the first construction as shown in FIGS. 1, 3 and 4, the bearing inner ring 16 is sized with a greater axial length than the outer ring 14 such that an upper axial end 16a of the bearing inner ring 16 is radially aligned with the housing upper end 12a. In such a configuration, the upper seal 20 is preferably disposed about the bearing inner ring 16 and may either seal directly against the ring 16 or against a seal inner case portion 84 disposed about the inner ring 16, as described below. In other constructions as depicted in FIGS. 6, 7, 9 and 10, the bearing inner ring 16 has an axial length at least generally equal to an axial length of the bearing outer ring 14, with the upper axial ends 14a, 16a of both bearing rings 14, 16 being spaced axially-downwardly from the housing upper end 12a. In such constructions, the hub bearing assembly 10 further comprises an annular spacer 30 disposed within the upper seal 20 and adjacent to the upper axial end 16a of the bearing inner ring 16, and in non-cartridge configurations, the upper seal 20 seals against the spacer 30.

Referring to FIGS. 1-7, 11 and 12, the hub bearing assembly 10 preferably further comprises an annular shield plate 32 coupled with the spacer 30, or in constructions without the spacer 30, with an upper axial end 16a of the bearing inner ring 16. The shield plate 32 extends radially outwardly from the spacer 30 or the inner ring 16 so as to extend across an upper end 13a of the housing bore 13 and across at least a portion of the housing upper end 12a. The shield plate 32 is spaced axially above the portion of the housing upper end 12a, has an axial end portion 33, and is configured to provide a labyrinth type seal to prevent debris or contaminants from entering the bore 13, as discussed in further detail below. Having described the basic components above, these and other details of the hub bearing assembly 10 of the present invention are described in greater detail below.

Referring to FIGS. 2, 3, 5, 6, 8 and 9, the housing 12 preferably includes a generally circular cylindrical body 40 having an inner central portion 42 and an outer flange portion 44. The central portion 42 has an inner circumferential surface 45 providing the housing bore 13 and preferably includes an annular shoulder 46 adjacent to the housing upper end 12a. The shoulder 46 extends radially into the bore 13 and includes an inner circumferential surface 47 and a radial stop surface 49. With this structure, the upper seal 20 is preferably disposed within the shoulder 46 and is frictionally engaged with the inner circumferential surface 47 to couple or retain the seal 20 within the housing 12, as described in further detail below. The outer flange portion 44 extends radially outwardly from the central portion 42 and is configured to connect with a frame 4 of the machine M (FIG. 1). Specifically, the flange portion 44 preferably includes a plurality of through holes 45 spaced circumferentially about the vertical axis $A_V$, each hole 45 being configured to receive a portion of a fastener (none shown) to connect the flange portion 44 with the frame 4. Preferably, the housing 12 is formed of low carbon steel, but may be formed of any other metallic material, a ceramic, a polymeric material or any other appropriate material.

Figure 6:
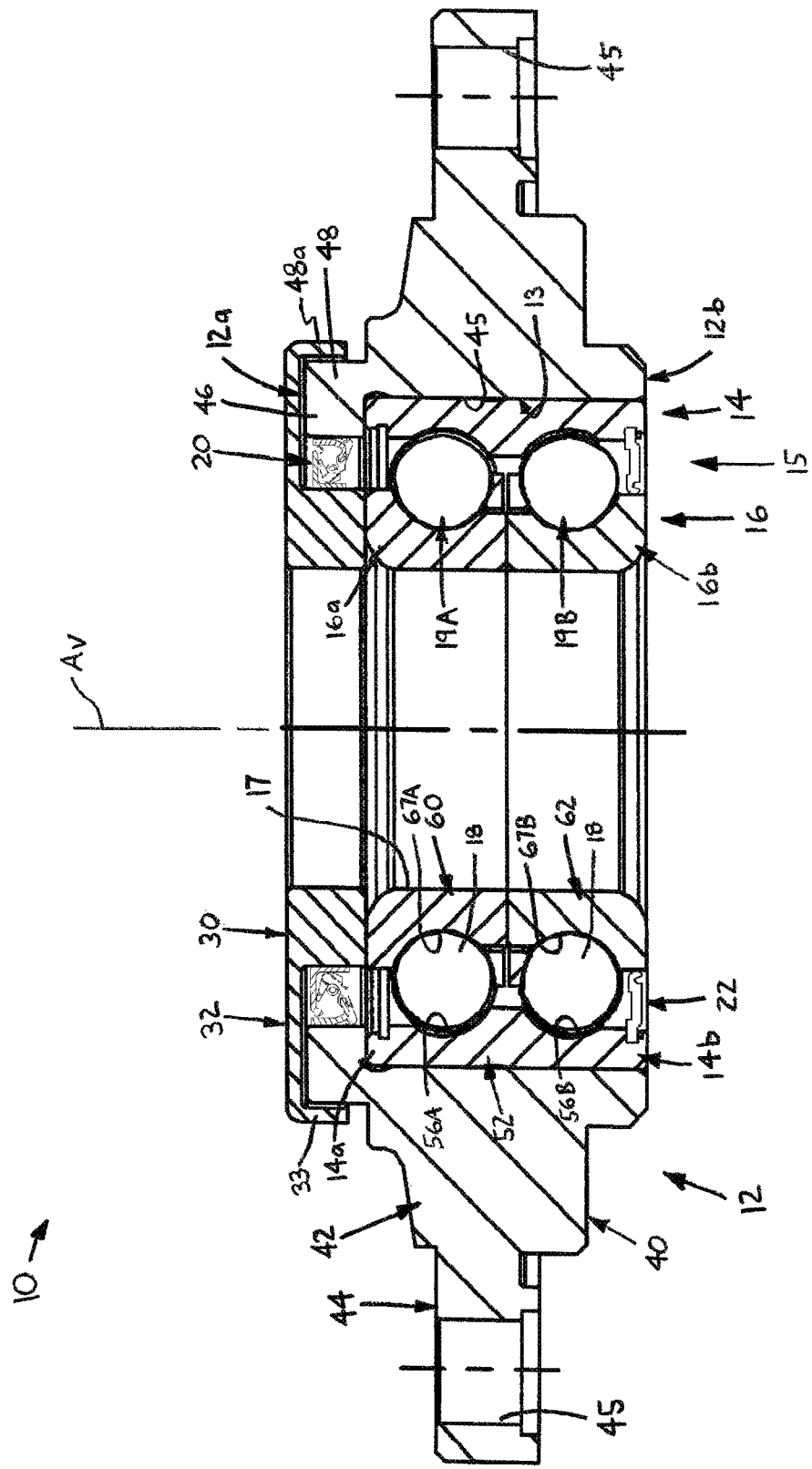
FIG. 6 is an axial cross-sectional view of the second construction hub bearing assembly.
Figure 7:
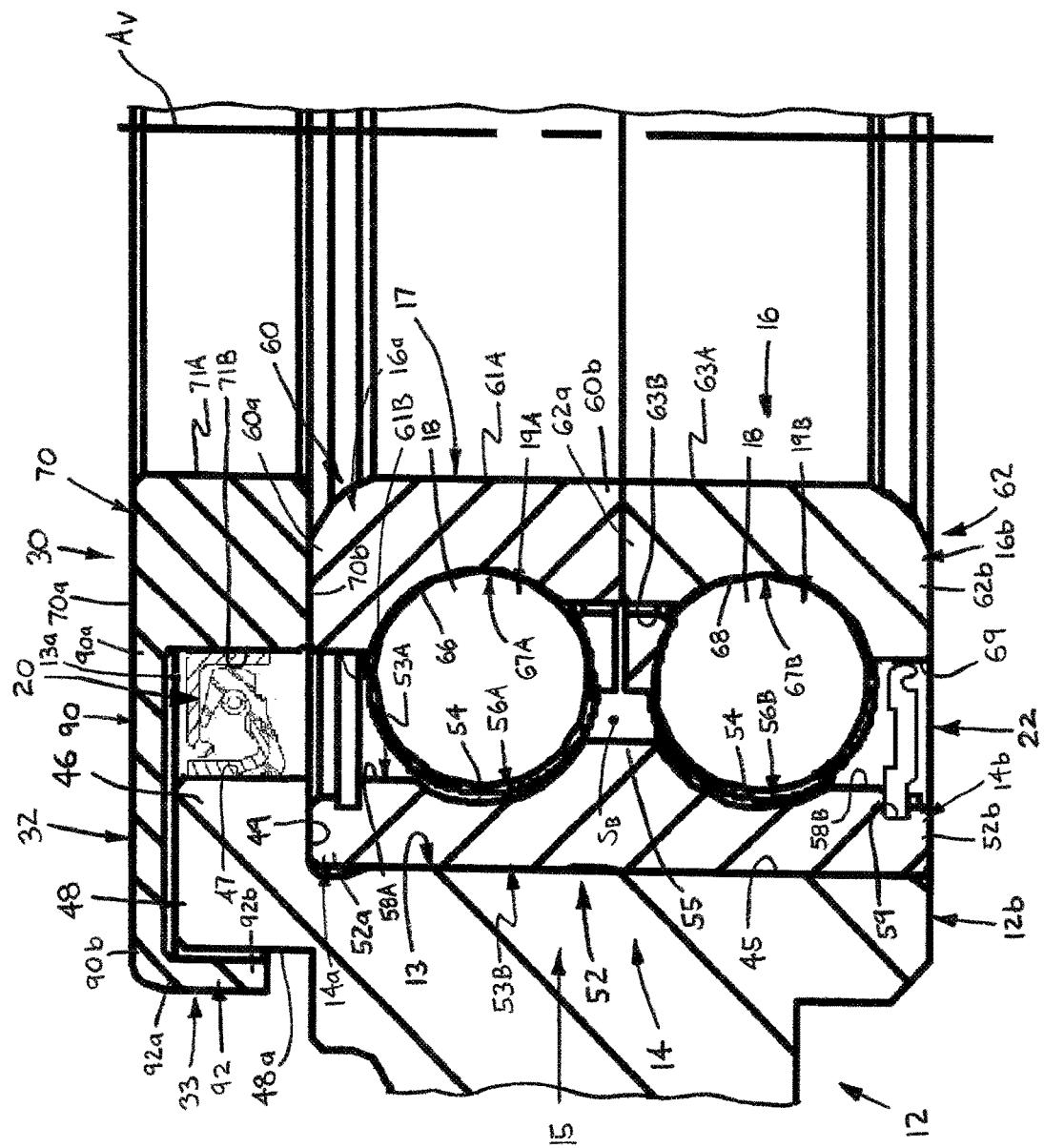
FIG. 7 is a more enlarged view of a portion of FIG. 6.
Figure 8:
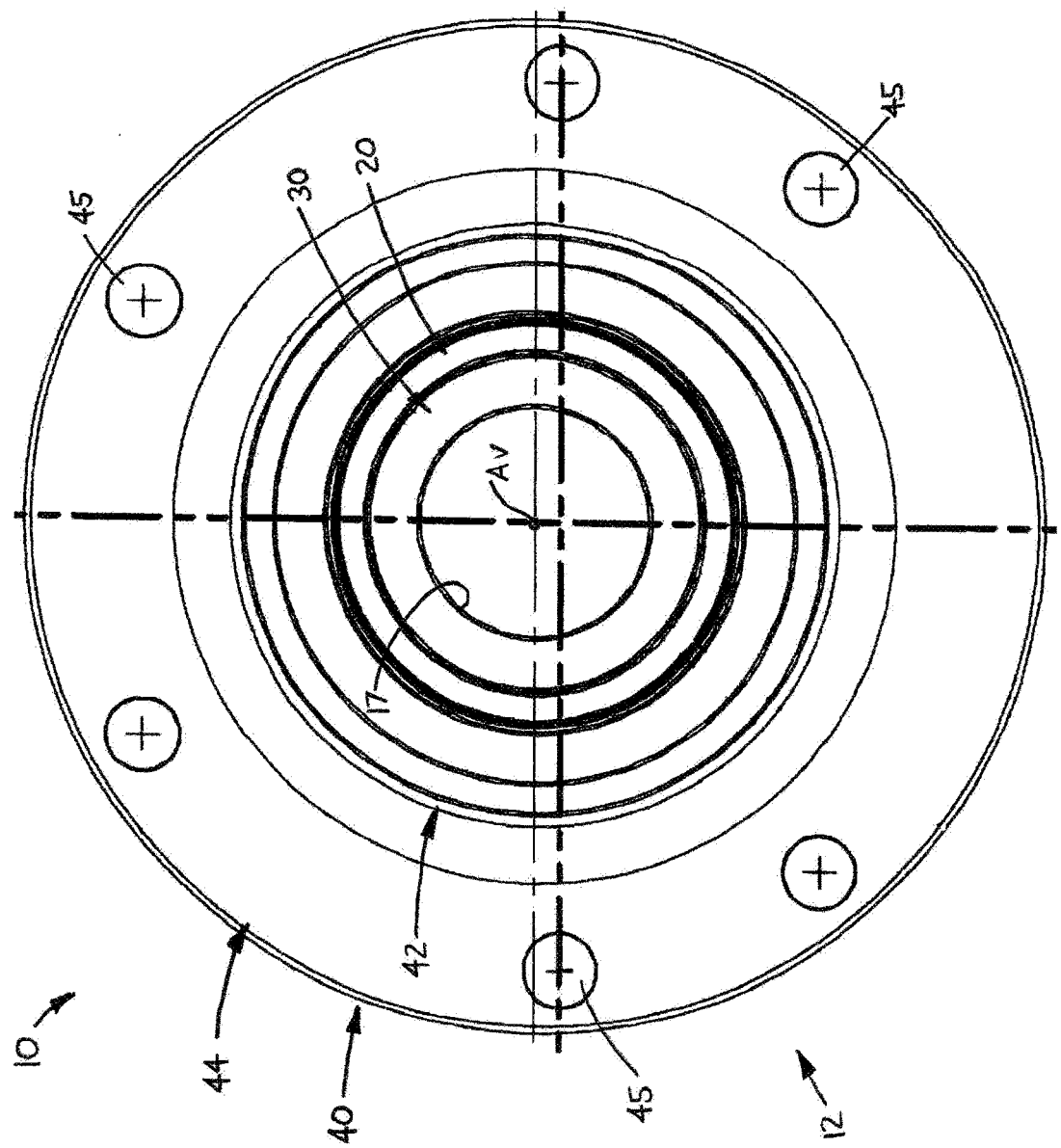
FIG. 8 is a top plan view of a third construction hub bearing assembly.
Figure 9:
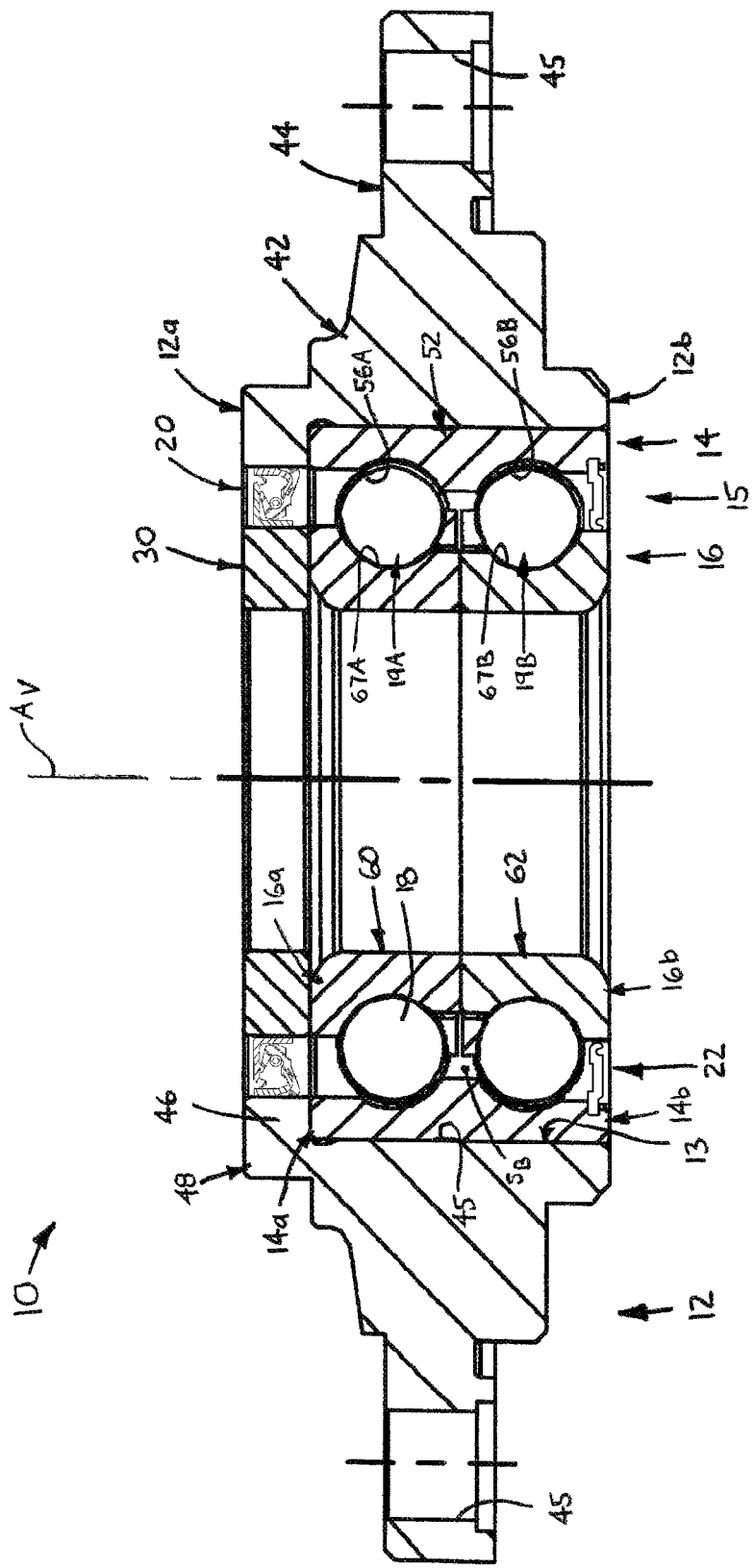
FIG. 9 is an axial cross-sectional view of the third construction hub bearing assembly.

Further, the housing 12 is preferably formed having a circular hub section 48 at the upper axial end 12a, the hub section 48 extending axially outwardly from a remainder of the central portion 42 and providing the shoulder 46 and an outer circumferential surface 48a. In the first construction, the hub section 48 has an annular groove 50 extending axially into the housing 12 and circumferentially about the axis $A_V$ for receiving the axial end portion 33 of the shield plate 32, as shown in FIGS. 1, 3 and 4. In the second construction, the shield plate end portion 33 is disposed about the hub outer circumferential surface 48a, as depicted in FIGS. 6 and 7. In either case, the shield plate 32 is spaced closely to, but not connected with, the housing 12 such that a tortuous path is provided between the plate 32 and the housing hub section 48, which acts as a labyrinth seal to prevent debris (e.g., plant cuttings, etc.) from entering into the housing bore 13, and therefore obstructs materials from "falling" or passing into the bearing 15.

Figure 10:
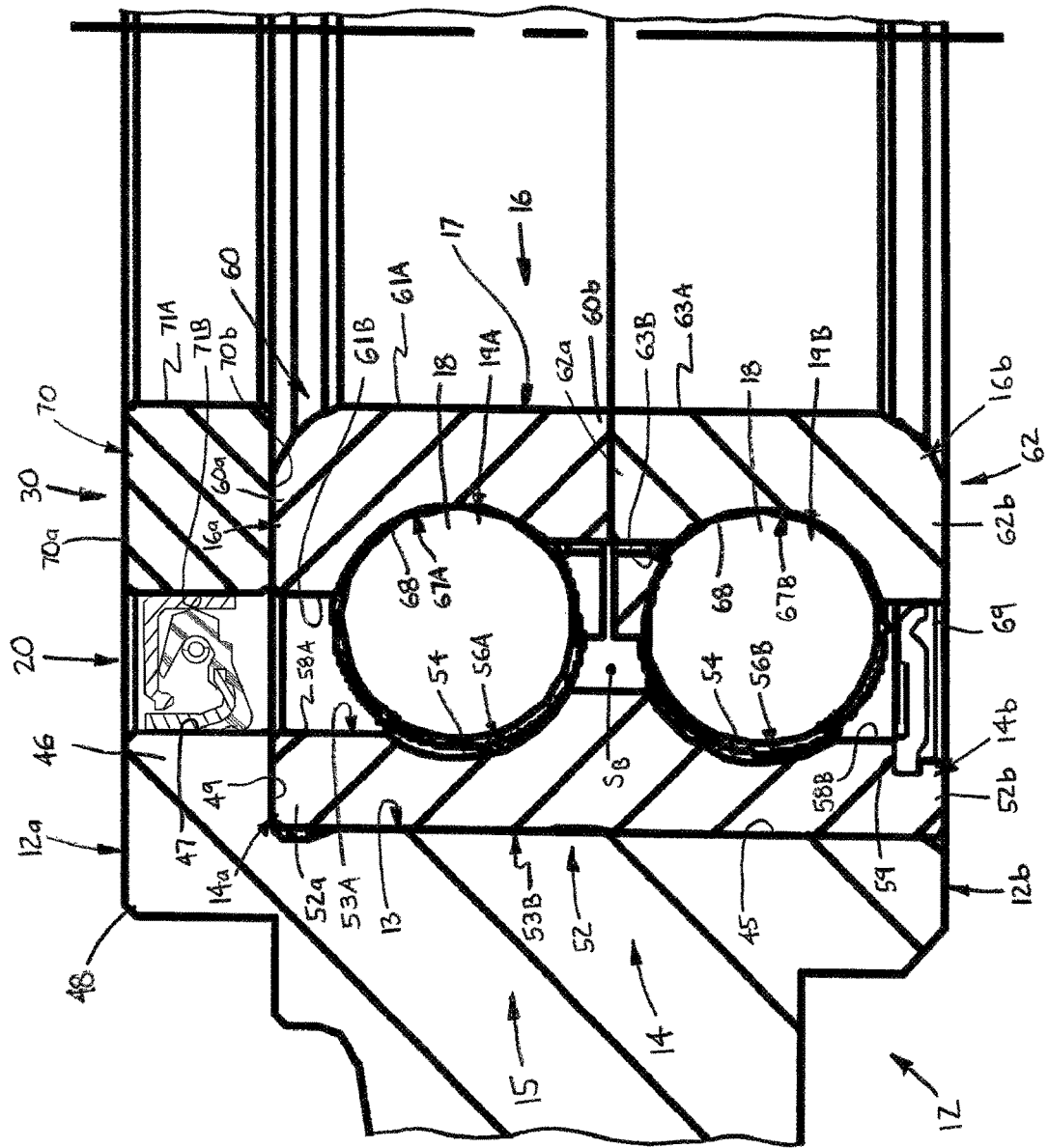
FIG. 10 is a more enlarged view of a portion of FIG. 9.

Referring to FIGS. 4, 7 and 10, the bearing outer ring 14 preferably includes a one-piece annular body 52 having inner and outer circumferential surfaces 53A, 53B, respectively, and upper and lower axial ends 52a, 52b, respectively. The body 52 has two annular grooves 54 extending radially outwardly from the body inner surface 53A, the grooves 54 being spaced axially apart, are separated by a central shoulder 55, and provide a separate one of two outer raceways 56A, 56B for the first and second sets 19A, 19B of the rolling elements 18. Further, upper and lower shoulder surfaces 58A, 58B are defined adjacent to each raceway 56A, 56B, respectively, and an annular seal retaining groove 59 extends radially outwardly from the lower shoulder surface 58B. A radially outer portion of the lower seal 22 is disposed within the groove 59 to connect the seal 22 with the bearing outer ring 14, as described below.

Preferably, the upper axial end 52a of the outer ring body 52 is disposed against the radial stop surface 49 of the housing shoulder 46 and the body outer circumferential surface 53B is frictionally engaged with the inner surface 45 of the housing bore 13 so as to axially locate and retain the bearing outer ring 14 within the housing bore 13 without a separate retaining ring. As a result, the lower axial end 52b of the bearing outer ring 14 is preferably generally radially aligned with the lower end 12b of the housing 12. Further, the annular body 52 of the bearing outer ring 14 is preferably formed of a high carbon alloy steel, such as 52100, etc., which is more expensive than the preferred low carbon steel of the housing 12. As such, by providing the housing shoulder 46 to retain the upper seal 20 and forming the lower seal 22 to be generally flat, the required size of the bearing outer ring 14 may be minimized and achieves a corresponding decrease in material cost of the hub bearing assembly 10.

Still referring now to FIGS. 4, 7 and 10, the bearing inner ring 16 is preferably formed of upper and lower ring sections 60, 62, respectively, each ring section 60, 62 including inner and outer circumferential surfaces 61A, 61B and 63A, 63B, respectively, and upper and lower axial ends 60a, 60b and 62a, 62b, respectively. The inner circumferential surfaces 61A, 63A of the two ring sections 60, 62 collectively define the central bore 17 for receiving a portion of the shaft 1. An annular groove 66 extends radially inwardly from the outer circumferential surface 61B of the upper ring section 60 and provides an inner raceway 67A for the first set 19A of rolling elements 18. Similarly, an annular groove 68 extends radially inwardly from the outer circumferential surface 63B of the lower ring section 62 and provides an inner raceway 67B for the second set 19B of rolling elements 18. Further, a lower shoulder surface section 69 is defined adjacent to the groove 68 and provides a contact surface for the lower seal 22, as discussed below. Preferably, the two ring sections 60, 62 are each axially sized such that the lower axial end 62b of the lower ring section 62 is generally radially aligned with the housing lower end 12b.

As discussed above, in the first construction shown in FIGS. 1-4, the upper ring section 60 is preferably formed "axially extended" (i.e., relatively elongated so as to extend axially outwardly from the outer ring 14) such that the upper axial end 60a is generally radially aligned with the upper end 12a of the housing 12. In such cases, the upper seal 20 is disposed about an upper shoulder surface 65 of the upper ring section 60. In the second construction depicted in FIGS. 5-7, the upper end 60a of the upper ring section 60 is disposed against a lower end 70b of the spacer 30. More specifically, the spacer 30 is preferably formed as an annular body 70 with upper and lower axial ends 70a, 70b, an inner circumferential surface 71A partially defining the bore 17 and an opposing outer circumferential surface 71B. The outer circumferential surface 71B either provides a seal contact surface for the upper seal 20, or preferably as described below, receives an inner case portion 84 of the upper seal 20.

Figure 11:
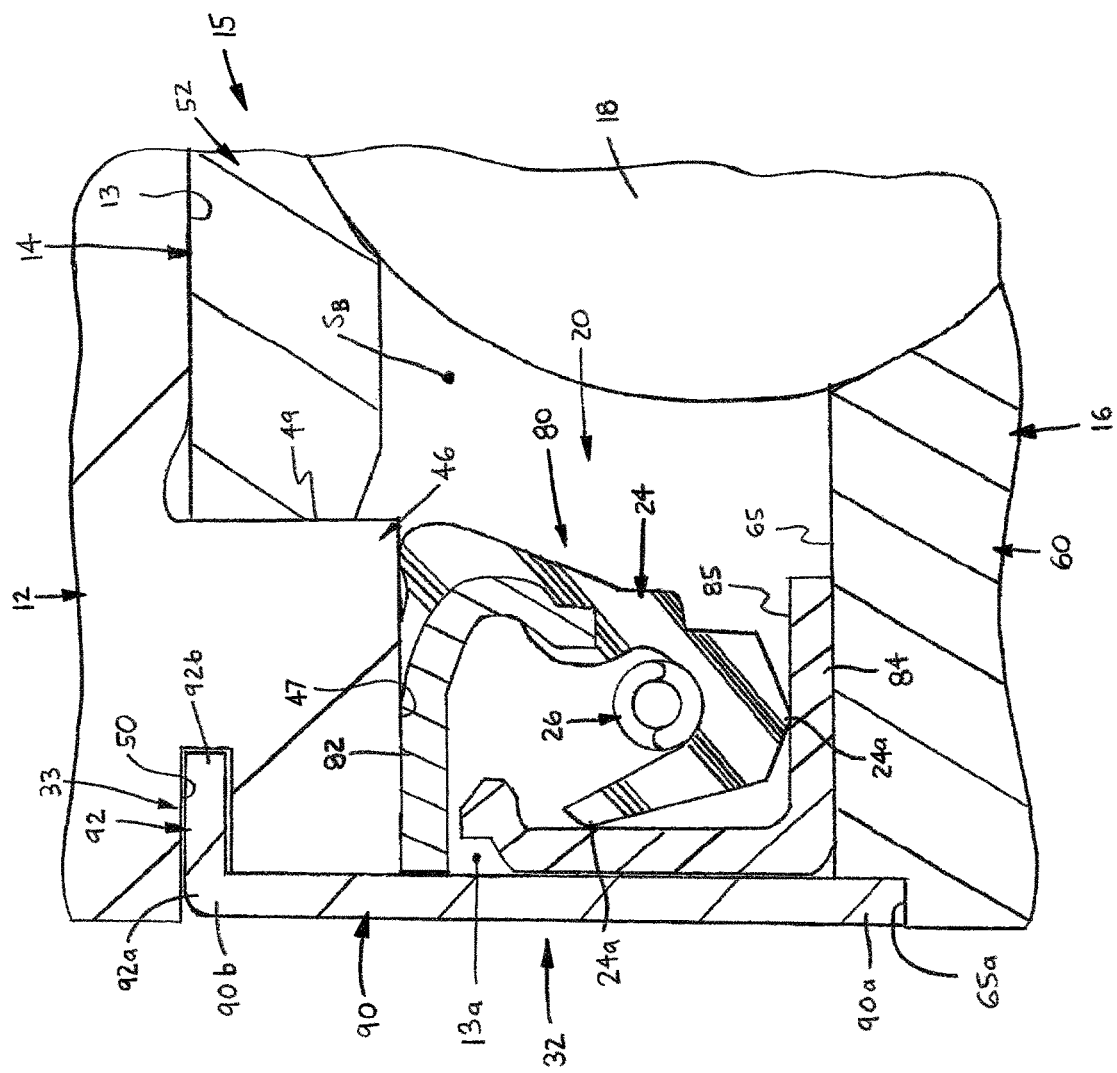
FIG. 11 is a greatly enlarged, axial cross-sectional view of an upper seal.

As best shown in FIG. 11, the upper seal 20 is preferably a cartridge seal 80 including an outer annular case portion 82 frictionally coupled with the housing 12 and an inner annular case portion 84 disposed about the spacer 30, as depicted in FIGS. 7, 10 and 11, or about the bearing inner ring 16 as shown in FIGS. 4 and 11. The seal body 24 is coupled with the outer case portion 82 and the sealing lip 24a is disposed against the inner case portion 84. In the depicted example, the spring 26 biases the lip 24a into sealing engagement with an outer circumferential surface 85 of the case portion 84, but the seal body 24 may alternatively include one or more conical lips (not shown) which engage the axial and/or radial portions of the inner case portion 84. However, the upper seal 20 may be formed in any other appropriate manner, such as for example, including only an outer case portion 82 for coupling the seal body 24 with the housing shoulder 46 and the sealing lip 24a sealing against the outer surface 71B of the spacer 30 or against the outer shoulder surface 65 of the upper ring section 60 of the bearing inner ring 16.

Figure 12:
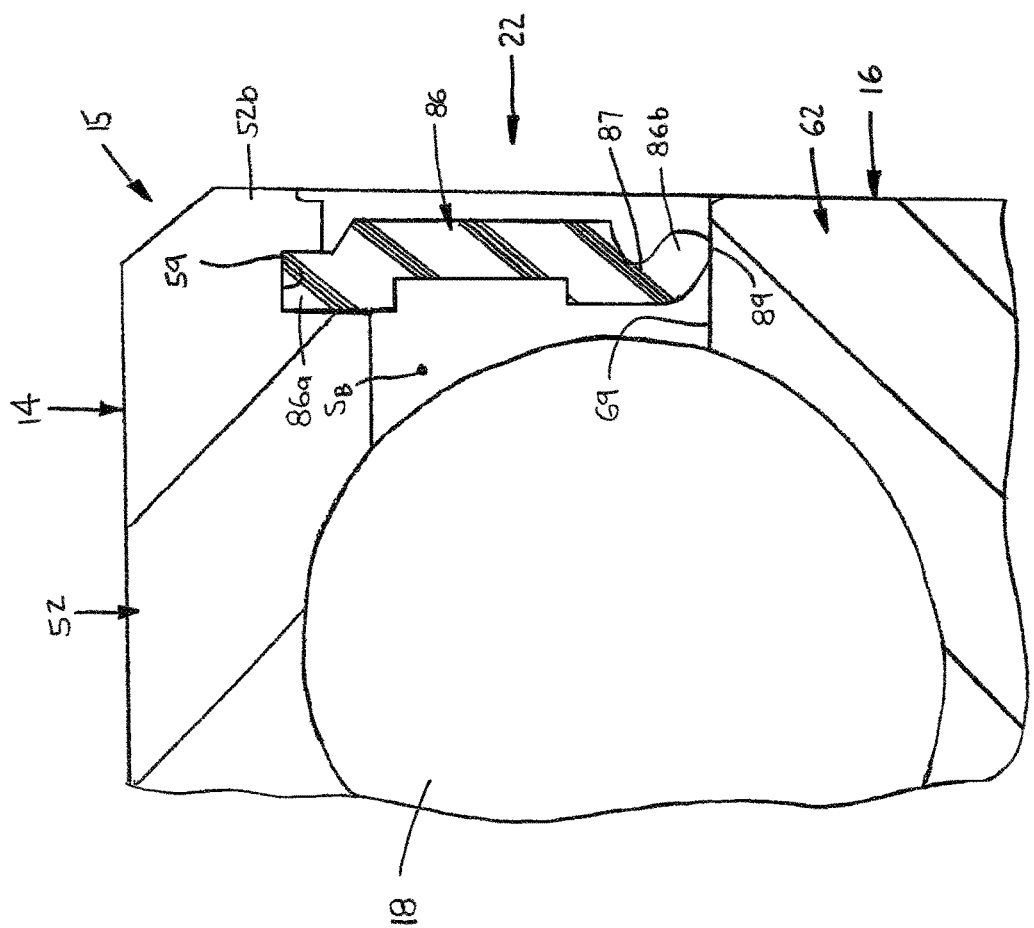
FIG. 12 is a greatly enlarged, axial cross-sectional view of a lower seal.

Referring particularly to FIG. 12, the lower seal 22 preferably includes an annular elastomeric plate 86 having outer and inner radial ends 86a, 86b, respectively. The plate outer radial end 86a is coupled with the bearing outer ring 14, specifically disposed within the annular groove 59 of the outer ring 14. The plate inner radial end 86b is sealingly engaged with the lower shoulder surface section 69 of the bearing inner ring 16. Preferably, the plate 86 has a bended section 87 at or adjacent to the inner radial end 86b providing a sealing lip 89, which is bended radially outwardly and is diametrically sized such that the sealing lip 89 engages the shoulder surface section 69 with at least a light interference fit so as to ensure adequate sealing. However, the plate bended section 87 has a relatively minimal axial extent so as to minimize the axial space required for installation and functioning of the lower seal 22.

Referring now to FIGS. 11, 13 and 14, the shield plate 32 preferably includes an inner annular radial section 90 and an outer annular axial section 92 integral with the radial section 90 and providing the above-noted shield axial end portion 33. The radial section 90 has an inner radial end 90a coupled with the spacer 30 (e.g., FIG. 14) or the bearing inner ring 16 (e.g., FIG. 11) and an opposing outer radial end 90b. The inner radial end 90a may be separately formed and coupled with the bearing inner ring 16 or the spacer 30 by any appropriate means, such as frictionally engaged with an outer circumferential shoulder surface section 65a of the inner ring 16, as shown in FIGS. 1-4 and 11. Alternatively, the radial inner end 90a may be integrally connected or formed with the spacer 30, specifically with the spacer outer circumferential surface 71B, such that the shield 32 and the spacer 30 are a single integrally formed component, as shown in FIGS. 5-7 and 14.

Further, the axial section 92 of the shield plate 32 extends circumferentially about the vertical axis $A_V$ and has an inner end 92a connected with the outer end 90b of the radial section and an opposing free end 92b. In the first construction wherein the shield plate 32 is separate from and attached to the bearing inner ring 16, the axial portion 92 has a relatively lesser axial extent and is disposed within the annular groove 50 in the housing hub section 48, as best shown in FIGS. 4 and 11. In the second construction shown in FIGS. 7 and 14, the shield axial portion 92 has a relatively greater axial extent and is disposed about the outer circumferential surface 48a of the housing hub section 48.

With the above structure, the hub bearing assembly 10 of the present invention has a number of advantages over previous known hub bearings used in similar applications. The overall axial length or height of the hub bearing assembly 10 may be substantially reduced due to the following structural features: locating the upper seal 22 externally of the outer ring 14 and within the housing shoulder 46 (typically present for supporting axial loading), retaining the outer ring 14 within the housing 12 by engagement with the bore 13, which eliminates the need for a separate retaining ring and allows the lower ends 14b, 16b of the rings 14, 16 to be radially aligned or "flush" with the housing lower end 12b, and forming the lower seal 22 with a generally "flat" elastomeric body and located between bearing shoulder surfaces with minimal axial lengths. Such a reduction in the overall axial length or height reduces material costs, reduces the weight of the hub bearing assembly 10 and minimizes the "profile" or space required within the machine M for assembly of the hub bearing assembly 10. Further, by locating the upper seal 20 externally of the bearing outer ring 14 and forming the lower seal 22 with a generally flat configuration, the required axial length of the bearing outer ring 14 may be substantially reduced, which reduces the amount of material required to fabricate the outer ring 14, such material typically being a relatively expensive high carbon alloy steel. Furthermore, by providing the separate shield plate 32 to form a labyrinth seal with adjacent surfaces of the housing 12, the necessity of machining complex mating profiles in the tool 2 and the housing 12 is eliminated.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A hub bearing assembly for supporting a shaft angularly displaceable about a vertical axis and connected with a tool, the hub bearing assembly comprising:
    a housing having upper and lower ends, a bore extending vertically between the upper and lower ends, the vertical axis extending longitudinally through the bore;
    a bearing outer ring disposed within the bore and coupled with the housing;
    a bearing inner ring disposed within the bearing outer ring and having a central bore configured to receive a portion of the shaft, the bearing inner ring being sized such that the upper axial end of the bearing inner ring is radially aligned with the housing upper end;
    at least one set of a plurality of rolling elements disposed between the bearing outer ring and the bearing inner ring and spaced circumferentially about the vertical axis;
    an upper seal disposed about the bearing inner ring and within the bore externally of the bearing outer ring so as to be spaced axially above the rolling elements and adjacent to the housing upper end, the upper seal including an annular elastomeric seal body with a sealing lip; and
    a lower seal disposed between the bearing inner ring and the bearing outer ring so as to be spaced axially below the rolling elements.

2. The hub bearing assembly as recited in claim 1 wherein:
    the housing has an annular shoulder adjacent to the housing upper end, the shoulder extending radially into the bore and having an inner circumferential surface; and
    the upper seal is disposed within the annular shoulder and engaged with the inner circumferential surface of the annular shoulder to couple the upper seal with the housing.

3. The hub bearing assembly as recited in claim 2 wherein the annular shoulder of the housing has a lower radial stop surface and the bearing outer ring has an upper axial end disposed against the radial stop surface of the shoulder.

4. The hub bearing assembly as recited in claim 1 further comprising an annular shield plate coupled with the upper axial end of the bearing inner ring and extending radially outwardly so as to extend over at least a portion of the upper end of the housing, the plate being spaced axially above the portion of the housing upper end so as to form a labyrinth seal.

5. The hub bearing assembly as recited in claim 4 wherein the shield has an inner radial end coupled with the bearing inner ring and an opposing outer radial end with an axial portion disposed about an outer circumferential surface of the housing or within an annular groove extending axially into the housing.

6. The hub bearing assembly as recited in claim 1 wherein at least one of:
    the upper seal is a cartridge seal including an outer annular case portion frictionally coupled with the housing and an inner annular case portion disposed about the bearing inner ring, the seal body being coupled with the outer annular case portion and the sealing lip being disposed against the inner annular case portion; and
    the lower seal includes an annular elastomeric plate having an outer radial end coupled with the bearing outer ring and an inner radial end sealingly engaged with a lower shoulder surface of the bearing inner ring.

7. The hub bearing assembly as recited in claim 6 wherein:
    the housing has an annular shoulder adjacent to the housing upper end, the shoulder extending radially into the bore and having an inner circumferential surface;
    the upper seal is disposed within the annular shoulder and the outer annular case portion of the upper seal is engaged with the inner circumferential surface of the annular shoulder to couple the upper seal with the housing; and
    the hub bearing assembly further comprises an annular shield plate coupled with the upper axial end of the bearing inner ring and extending radially outwardly so as to extend over at least a portion of the upper end of the housing, the plate being spaced axially above the portion of the housing upper end so as to form a labyrinth seal.

8. The hub bearing assembly as recited in claim 1 wherein the housing has a central portion providing the bore and a flange portion extending radially outwardly from the central portion and configured to connect with a component of a machine.

9. The hub bearing assembly as recited in claim 1 wherein the lower axial end of the bearing outer ring and the lower axial end of the bearing inner ring are each radially aligned with the housing lower end.

10. The hub bearing assembly as recited in claim 1 wherein the bore is defined by an inner circumferential surface and the bearing outer ring is configured to engage with the housing inner circumferential surface to retain the bearing outer ring within the housing without a separate retaining ring.

11. A hub bearing assembly for supporting a shaft angularly displaceable about a vertical axis and connected with a tool, the hub bearing assembly comprising:
   a housing having upper and lower ends, a bore extending vertically between the upper and lower ends, the vertical axis extending longitudinally through the bore;
   a bearing outer ring disposed within the bore and coupled with the housing;
   a bearing inner ring disposed within the bearing outer ring and having a central bore configured to receive a portion of the shaft;
   at least one set of a plurality of rolling elements disposed between the bearing outer ring and the bearing inner ring and spaced circumferentially about the vertical axis;
   an upper seal disposed within the bore externally of the bearing outer ring so as to be spaced axially above the rolling elements and adjacent to the housing upper end, the upper seal including an annular elastomeric seal body with a sealing lip;
   a lower seal disposed between the bearing inner ring and the bearing outer ring so as to be spaced axially below the rolling elements; and
   an annular spacer disposed within the upper seal and adjacent to the upper axial end of the bearing inner ring;
   wherein the housing has an annular shoulder adjacent to the housing upper end, the shoulder extending radially into the bore and having an inner circumferential surface, and the upper seal is disposed within the annular shoulder and engaged with the inner circumferential surface of the annular shoulder to couple the upper seal with the housing.

12. The hub bearing assembly as recited in claim 11 wherein the annular shoulder of the housing has a lower radial stop surface and the bearing outer ring has an upper axial end disposed against the radial stop surface of the shoulder.

13. The hub bearing assembly as recited in claim 11 further comprising an annular shield plate coupled with the spacer and extending radially outwardly so as to extend over at least a portion of the upper end of the housing, the plate being spaced axially above the portion of the housing upper end so as to form a labyrinth seal.

14. The hub bearing assembly as recited in claim 13 wherein the shield has an inner radial end coupled with the spacer and an opposing outer radial end with an axial portion disposed about an outer circumferential surface of the housing or within an annular groove extending axially into the housing.

15. The hub bearing assembly as recited in claim 11 wherein at least one of:
   the upper seal is a cartridge seal including an outer annular case portion frictionally coupled with the housing and an inner annular case portion disposed about the spacer, the seal body being coupled with the outer annular case portion and the sealing lip being disposed against the inner annular case portion; and
   the lower seal includes an annular elastomeric plate having an outer radial end coupled with the bearing outer ring and an inner radial end sealingly engaged with a lower shoulder surface of the bearing inner ring.

16. The hub bearing assembly as recited in claim 15 wherein:
   the housing has an annular shoulder adjacent to the housing upper end, the shoulder extending radially into the bore and having an inner circumferential surface;
   the upper seal is disposed within the annular shoulder and the outer annular case portion of the upper seal is engaged with the inner circumferential surface of the annular shoulder to couple the upper seal with the housing; and
   the hub bearing assembly further comprises an annular shield plate coupled with the spacer and extending radially outwardly so as to extend over at least a portion of the upper end of the housing, the plate being spaced axially above the portion of the housing upper end so as to form a labyrinth seal.

17. The hub bearing assembly as recited in claim 11 wherein the housing has a central portion providing the bore and a flange portion extending radially outwardly from the central portion and configured to connect with a component of a machine.

18. The hub bearing assembly as recited in claim 11 wherein at least one of:
   the lower axial end of the bearing outer ring and the lower axial end of the bearing inner ring are each radially aligned with the housing lower end; and
   the bore is defined by an inner circumferential surface and the bearing outer ring is configured to engage with the housing inner circumferential surface to retain the bearing outer ring within the housing without a separate retaining ring.

19. A hub bearing assembly for supporting a shaft angularly displaceable about a vertical axis and connected with a tool, the hub bearing assembly comprising:
   a housing having upper and lower ends, a bore extending vertically between the upper and lower ends, the vertical axis extending longitudinally through the bore;
   a bearing outer ring disposed within the bore and coupled with the housing;
   a bearing inner ring disposed within the bearing outer ring and having a central bore configured to receive a portion of the shaft;
   at least one set of a plurality of rolling elements disposed between the bearing outer ring and the bearing inner ring and spaced circumferentially about the vertical axis;
   an upper seal disposed within the bore externally of the bearing outer ring so as to be spaced axially above the rolling elements and adjacent to the housing upper end, the upper seal including an annular elastomeric seal body with a sealing lip;
   a lower seal disposed between the bearing inner ring and the bearing outer ring so as to be spaced axially below the rolling elements; and
   an annular spacer disposed within the upper seal and adjacent to the upper axial end of the bearing inner ring;
   wherein the housing has a central portion providing the bore and a flange portion extending radially outwardly from the central portion and configured to connect with a component of a machine.

* * * * *